United States Patent [19]
Morsbach et al.

[11] Patent Number: 6,004,524
[45] Date of Patent: Dec. 21, 1999

[54] LOWERING OF THE NITROGEN OXIDE LEVELS IN EXHAUST GASES BY CONTROLLED ADDITION OF $NH_3$

[75] Inventors: Bernd Morsbach, Ludwigshafen; Helmut Daudel, Schorndorf; Uwe Gaertner, Weinstadt, all of Germany

[73] Assignees: BASF Aktiengesellschaft, Ludwigshafen; Mercedes-Benz Aktiengesellscaft, Stuggart, both of Germany

[21] Appl. No.: 08/014,407

[22] Filed: Feb. 5, 1993

[51] Int. Cl.[6] .......................................................... B01J 8/00
[52] U.S. Cl. ............................................................ 423/239.1
[58] Field of Search .................. 423/239, 239 A, 423/213.5

[56] References Cited

U.S. PATENT DOCUMENTS 4,963,332  10/1990  Brand et al. ............................. 423/239

Primary Examiner—Thomas Dunn
Attorney, Agent, or Firm—Keil & Weinkauf

[57] ABSTRACT

A process for selective catalytic reduction of nitrogen oxides from exhaust gases, preferably those from diesel engines in vehicles, using pulsed superstoichiometric addition of $NH_3$ or $NH_3$-releasing substances, comprises controlling the pulsed superstoichiometric addition of $NH_3$ in such a way that, after it has started, the addition is interrupted again only when the amount of $NH_3$ stored in the catalyst has reached a specific upper threshold value which is predetermined in accordance with the catalyst properties and the catalyst volume, the amount of $NH_3$ stored being calculated from the difference between the metered amount of $NH_3$ and the amount of $NO_x$ separated off, which is determined from the $NO_x$ concentration in the exhaust gas and the average degree of separation, and the addition of $NH_3$ is resumed only when the amount of $NH_3$ stored in the catalyst, which is determined in the same way, has reached a predetermined lower threshold value, this pulsed addition of $NH_3$ being interrupted after a predetermined number of cycles until the amount of $NH_3$ stored in the catalyst, which is determined in the manner described, has completely reacted, this completing one entire cycle of the pulsed addition of $NH_3$.

6 Claims, No Drawings

LOWERING OF THE NITROGEN OXIDE LEVELS IN EXHAUST GASES BY CONTROLLED ADDITION OF NH₃

The present invention relates to a process for the selective catalytic reduction of nitrogen oxides from exhaust gases, preferably those from diesel engines in vehicles, using pulsed superstoichiometric addition of $NH_3$ or $NH_3$-releasing substances.

The majority of nitrogen oxide emissions in modern industrial countries come from traffic, fossil fuel-fired power stations and industrial plants. Whereas power station and industrial emissions are being reduced by the construction of appropriate off-gas treatment systems, the contribution from traffic is coming increasingly to the forefront. In addition, emission-reducing measures in the case of relatively small gas sources and operation at from 100° C. to 300° C. are becoming increasingly important.

In petrol engines the nitrogen oxides can be reduced in a known manner by means of a three-way catalytic converter in stoichiometric operation, the unconsumed or partially oxidized components of the exhaust gas ideally being available in the stoichiometric ratio as reducing agent for the nitrogen oxides formed.

In the case of mixture-controlled diesel engines it is not possible to lower the nitrogen oxide levels in this way because these engines operate on the superstoichiometric principle. On the other hand, nitrogen oxide emissions from diesel engines, especially from the low consumption direct injection engines dominant in the commercial vehicle sector, make up a high proportion of total emissions.

German Patent 24 58 888 discloses a catalyst with which nitrogen oxides are reacted selectively, with the addition of $NH_3$ as reducing agent, to give nitrogen and water. This catalyst is widely used in a process for lowering the nitrogen oxide levels in power station off-gases, in which process $NH_3$ is supplied continuously to the exhaust gas in the stoichiometric ratio, based on the desired conversion.

This process is described in numerous publications. In addition to determination of the amount of exhaust gas, this process requires measurement of the $NO_x$ inlet and outlet concentrations in order to control $NH_3$ metering.

This control has proved advantageous in the case of the slow changes in exhaust gas amounts and $NO_x$ concentrations which occur in power stations, but, because of the large time constants for the control, is unsuitable for the exceptionally severe and rapid changes in amounts and concentrations which occur in the operation of a commercial vehicle diesel engine. Furthermore, in the low temperature range (100° C. to 300° C.) this control leads to poor utilization of the catalyst material and very large catalyst volumes are therefore required.

In the article "Extended Reactor Concept for Dynamic Denox Design" in the journal Chemical Engineering Science, Vol. 43, 1988, No. 8, pages 2073 to 2078, it is stated that adsorptive loading of the catalyst with $NH_3$ with a subsequent operating phase in which the adsorbed $NH_3$ reacts with the $NO_x$ in the gas to be treated is advantageous. Because of the preloading of the catalyst with $NH_3$, substantial fluctuations in the amount of exhaust gas and $NO_x$ concentration are not a problem with this procedure. However, this process has the disadvantage that the direction of flow through the catalyst has to be reversed periodically, in order to obtain a defined loading of the catalyst.

Control of $NH_3$ metering as described in German Patent 38 25 206 avoids this disadvantage. This control provides pulsed superstoichiometric metered addition of the reducing agent $NH_3$ without flow reversal but in the procedure described does not achieve defined loading of the catalyst which is required if the catalyst is to have a high $NO_x$ separation efficiency in operation with substantial fluctuations in the amount of exhaust gas and in its $NO_x$ concentration, but also at low operating temperatures; a defect for which it is not possible to compensate even by measuring both $NO_x$ concentrations.

The disadvantages of these two processes, ie. periodic flow reversal and undefined catalyst loading, make it impractical to use these processes in the commercial vehicle sector.

It is an object of the present invention to reduce nitrogen oxide emissions from diesel engines in vehicles.

We have found that this object is achieved by controlling the pulsed superstoichiometric addition of $NH_3$ in such a way that, after it has started, the addition is interrupted again only when the amount of $NH_3$ stored in the catalyst has reached a specific upper threshold value which is predetermined in accordance with the catalyst properties and the catalyst volume, the amount of $NH_3$ stored being calculated from the difference between the metered amount of $NH_3$ and the amount of $NO_x$ separated off, which is determined from the $NO_x$ concentration in the exhaust gas and the average degree of separation, and the addition of $NH_3$ is resumed only when the amount of $NH_3$ stored in the catalyst, which is determined in the same way, has reached a predetermined lower threshold value, this pulsed addition of $NH_3$ being interrupted after a predetermined number of cycles until the amount of $NH_3$ stored in the catalyst, which is determined in the manner described, has completely reacted, this completing one entire cycle of the pulsed addition of $NH_3$.

In the process according to the invention the catalyst is loaded with $NH_3$ in a loading phase by superstoichiometric addition of $NH_3$. As a result of this loading, a relatively steep $NH_3$ adsorption front develops in the catalyst, as extensive studies have shown. As this adsorption front advances in the catalyst, the amount of $NH_3$ stored in the catalyst increases and can be calculated as the difference between the amount supplied and the amount which has reacted with $NO_x$. The $NH_3$ feed is switched off when the amount of $NH_3$ stored in the catalyst has reached a value at which the adsorption front has advanced just far enough for the associated $NH_3$ concentration in the gas phase in the downstream portion of the catalyst to be lowered, as a result of adsorption and reaction, to such an extent that no inadmissible residual concentrations of $NH_3$ occur at the outlet from the catalyst.

This amount of $NH_3$ can be determined for each individual case by experiments or on the basis of reaction kinetic considerations and can be specified as a set value or as performance characteristics as a function of diverse operating parameters. The amount of $NO_x$ supplied by the diesel engine to the catalyst in a cycle, ie. in the loading phase and in the subsequent reaction phase without addition of $NH_3$, can be approximately integrated over time from the speed and control rod travel operating data of the engine or from other operating parameters with the aid of the known engine performance characteristics. Similar approximate calculations on the basis of relevant parameters are generally possible for other sources of exhaust gas.

Using an average degree of separation, the amount of $NH_3$ which has reacted can be determined from this amount of $NO_x$ in the exhaust gas and continuous calculation of the amount of $NH_3$ stored in the catalyst is therefore possible as the difference between the amount of $NH_3$ reacted and the amount supplied. This calculation can be further refined by including performance characteristics for the degree of separation which represent the dependence of the main parameters speed or amount of exhaust gas, $NO_x$ in the exhaust gas, catalyst temperature and $NH_3$ loading.

If this stored amount of $NH_3$ in the reaction phase which is calculated on-line has fallen below a predetermined lower threshold value, the first individual cycle is complete and the next individual cycle is started in the same way by resumed addition of $NH_3$.

Since the stored amount of $NH_3$ is only calculated indirectly and is not monitored by measurement, a discrepancy necessarily results between the calculated and the actual stored amount of $NH_3$ and this discrepancy of course becomes greater with every individual cycle and leads either to inadequate loading with inadequate separation or to excessive loading with breakthrough of unreacted $NH_3$. According to the invention this problem is solved, avoiding measurement of the concentration, in that, after a predetermined number of individual cycles, the amount of $NH_3$ stored in the catalyst is completely or at least substantially consumed by reaction with $NO_x$ by switching off the $NH_3$ feed, as a result of which a defined loading is again achieved. This discharge phase must be continued beyond the time at which calculation indicates that no $NH_3$, or only a totally negligible amount, is still stored in the catalyst, in order to compensate for the differences between calculated and actual loading of the catalyst, before resuming the addition of $NH_3$ in a new entire cycle.

According to the invention, this control of the addition of $NH_3$ can be further improved if measurement of the $NO_x$ concentration, for example in the form of an emission measuring point, is available, or can be installed at reasonable cost, downstream of the catalyst. In this case the target defined loading of the catalyst at the end of an entire cycle can also be determined by the fall in $NO_x$ separation to a predetermined level, which also corresponds to a defined loading, instead of by complete reaction of the stored $NH_3$ with $NO_x$. According to the invention, this results in the advantage that the discharge phase is ended and the addition of $NH_3$ can be resumed before the $NO_x$ separation falls away completely, which is unavoidable if the stored $NH_3$ reacts to completion. A distinct increase in the average degree of separation can be achieved in this way.

The predetermined level of $NO_x$ separation which defines the end of the discharge phase can be defined either as a specific $NO_x$ concentration downstream of the catalyst or as a specific degree of separation or, with the aid of the separation performance characteristics described, as a specific $NH_3$ loading.

In addition, according to the invention it is possible to integrate the $NO_x$ concentration measured downstream of the catalyst over an entire cycle and the amount of $NH_3$ metered in and, with the aid of these values, to draw up an $NH_3$ balance over the entire cycle, which can then be compared with the $NH_3$ loading calculated on-line, by which means correction of the performance characteristics on which the calculation is based can be effected in the sense of a self-learning control system. Interference effects can cause these corrections to increase beyond the extent to be expected. In this case, according to the invention, a limitation can occur and a fault message be given by the control. If, however, the corrections are only small, it is possible, according to the invention, to adjust the number of individual cycles in an entire cycle in such a way that the number of individual cycles can be increased if there is good agreement between the measured and the calculated values and decreased if the agreement is poor.

According to the invention, a further improvement in $NH_3$ metering is possible by measuring he $NO_x$ concentration in the exhaust gas, since in this way it is possible to avoid the errors which are unavoidable when this concentration and the degree of separation are determined from the performance characteristics. Moreover, the not inconsiderable expense for the determination of these performance characteristics can thus be saved. At the same time, measurement of the two $NO_x$ concentrations makes it possible to monitor the degree of separation over time, which enables a warning to be given if there is an excessive fall in the separation efficiency.

We claim:

1. A process for selective catalytic reduction of nitrogen oxides from exhaust gases using pulsed superstoichiometric addition of $NH_3$ or $NH_3$-releasing substances, which comprises controlling the pulsed superstoichiometric addition of $NH_3$ in such a way that, after it has started, the addition is interrupted again only when the amount of $NH_3$ stored in the catalyst has reached a specific upper threshold value which is predetermined in accordance with the catalyst properties and the catalyst volume, the amount of $NH_3$ stored being calculated from the difference between the metered amount of $NH_3$ and the amount of $NO_x$ separated off, which is determined from the $NO_x$ concentration in the exhaust gas and the average degree of separation, and the addition of $NH_3$ is resumed only when the amount of $NH_3$ stored in the catalyst, which is determined in the same way, has reached a predetermined lower threshold value, this pulsed addition of $NH_3$ being interrupted after a predetermined number of cycles until the amount of $NH_3$ stored in the catalyst, which is determined in the manner described, has either completely reacted or reached a defined loading as determined by the increase of $NO_x$ concentration downstream of the catalyst to a predetermined threshold value which corresponds to said defined loading of $N_3$, this completing one entire cycle of the pulsed addition of $NH_3$.

2. The process as of claim 1, wherein the exhaust gases are from diesel engines and wherein the $NO_x$ concentration in the exhaust gas is calculated from the relevant process parameters of the process in which the exhaust gas is formed, based on engine speed, control rod travel and loading pressure.

3. The process of claim 1, wherein the average degree of separation is determined from separation performance characteristics based on the catalyst temperature, the amount of exhaust gas, the $NO_x$ concentration in the exhaust gas and the $NH_3$ loading.

4. The process of claim 1, wherein the upper and lower threshold values for switching on and switching off the addition of $NH_3$ are specified in the form of performance characteristics as a function of engine speed and exhaust gas temperature.

5. The process of claim 1, wherein the $NO_x$ concentration downstream of the catalyst is measured and the interruption in $NH_3$ metering after the predetermined number of cycles does not continue until the $NH_3$ stored in the catalyst has completely reacted but the addition of $NH_3$ is resumed when the $NO_x$ concentration downstream of the catalyst exceeds a predetermined threshold value.

6. The process of claim 5, wherein the threshold value of the $NO_x$ concentration downstream of the catalyst is determined as a function of the instantaneous values of the $NO_x$ concentration upstream of the catalyst, the amount of exhaust gas and the catalyst temperature.

* * * * *

UNITED STATES PATENT AND TRADEMARK OFFICE
CERTIFICATE OF CORRECTION

PATENT NO.: 6,004,524

DATED: December 21, 1999

INVENTOR(S): MORSBACH et al.

It is certified that error appears in the above-identified patent and that said Letters Patent is hereby corrected as shown below:

On the cover page: Item

--[30]     Foreign Application Priority Data
Feb. 5, 1992    [DE]   Germany    ................. P 42 03 219.9--.

Col. 4, claim 1, line 36, "$N_3$" should be --$NH_3$--.

Col. 4, claim 2, line 38, delete "as".

Signed and Sealed this

Fifteenth Day of August, 2000

Attest:

Q. TODD DICKINSON

Attesting Officer     Director of Patents and Trademarks